United States Patent [19]

Kramer et al.

[11] 4,072,782
[45] Feb. 7, 1978

[54] COMPOSITE EROSION RESISTANT OPTICAL WINDOW

[75] Inventors: William E. Kramer, Plum Borough; Richard H. Hopkins, Monroeville; Richard A. Hoffman, Franklin, all of Pa.

[73] Assignee: Westinghouse Electric Corporation, Pittsburgh, Pa.

[21] Appl. No.: 647,025

[22] Filed: Jan. 7, 1976

[51] Int. Cl.$^2$ .................... B29D 11/00; G02B 1/00; B32B 17/06
[52] U.S. Cl. .................... 428/409; 428/432; 428/539; 428/911; 428/913; 428/918
[58] Field of Search ............ 428/913, 539, 911, 918, 428/426, 432, 409

[56] References Cited

U.S. PATENT DOCUMENTS

| | | | |
|---|---|---|---|
| 2,651,584 | 9/1953 | Longini et al. | 428/539 X |
| 2,688,565 | 9/1954 | Raymond | 428/539 X |
| 2,710,274 | 7/1955 | Kuehl | 428/913 X |
| 2,834,689 | 5/1958 | Jupnik | 428/432 X |
| 3,034,916 | 5/1962 | Eshner | 428/539 |
| 3,176,575 | 4/1965 | Socha | 428/539 X |
| 3,922,440 | 11/1975 | Wegwerth | 428/913 X |
| 3,971,874 | 7/1976 | Ohta et al. | 428/913 X |

*Primary Examiner*—Harold Ansher
*Attorney, Agent, or Firm*—D. Schron

[57] ABSTRACT

An optical window is provided, particularly for multispectral or broadband wavelength (visible and infrared) transmission, which is resistant to damage or erosion by high velocity raindrops or other adverse environmental conditions. The window consists of a substrate of material having the necessary optical properties for the desired spectral range, with a cladding or protective layer of material of high resistance to erosion or other damage bonded to the substrate by a glass bonding material. While any suitable materials meeting the optical and physical requirements may be used, the substrate may be a material such as zinc selenide with a protective layer of zinc sulfide bonded to the substrate by a thin layer of a chalcogenide glass.

8 Claims, 2 Drawing Figures

COMPOSITE EROSION RESISTANT OPTICAL WINDOW

BACKGROUND OF THE INVENTION

The present invention relates to optical windows, and especially to windows for visible and near infrared transmission intended for use in airborne reconnaissance and surveillance systems.

Airborne systems of this type, which may use infrared sensors, TV imagers, and laser designators, for example, require windows with good optical transparency over the range of wavelengths utilized (approximately 0.5 to 12 $\mu$m). Broadband window materials now available for this purpose, however, are sensitive to moisture and are especially subject to erosion and other damage by high velocity raindrops striking the surface. This, of course, is a frequent environmental condition in airborne service, and many materials having excellent transparency at the desired wavelengths, and other desirable properties, are not acceptable for use in airborne optical windows because of the rapid erosion by rain or moisture which causes progressive loss in optical transmission, as well as other mechanical damage, or even catastrophic failure. Other materials are available which have good resistance to rain erosion and other damage under these severe conditions of airborne use but which have poor optical transmission in the infrared spectral range, especially in the relatively thick sections required for adequate mechanical strength, so that these materials are not suitable for use as airborne windows.

It has been proposed to provide protective surface coatings on optical windows to protect them from erosion by raindrops so as to permit the use of materials of good optical properties. Thus, it has been suggested that materials such as barium fluoride and sodium chloride which have good optical transparency in the infrared but are very moisture sensitive may be protected by coatings of such materials as calcium fluoride, lanthanum trifluoride and polytetrafluoroethylene which have good moisture resistance. Such coatings are applied by vacuum deposition, that is, by vaporization or sputtering of the coating material in a vacuum to deposit a film or coating of the desired thickness on the substrate. Such vacuum deposited coatings by themselves, however, are not satisfactory because of their susceptibility to cracking and propagation of scratches, as well as having a tendency to separate from the substrate.

SUMMARY OF THE INVENTION

In accordance with the present invention, there is provided a composite optical window providing good resistance to rain erosion and other adverse conditions and having good optical properties. This result is accomplished by providing a substrate of a material such as zinc selenide which has high transparency in the infrared, or other desired spectral range, and protecting it against rain erosion or other damage by a hard, erosion resistant, protective layer of a material such as zinc sulfide which may have relatively poorer optical transmission but which can be utilized in thin sections without seriously affecting the transparency of the composite. The protective layer is bonded to the substrate by a layer of a glass, or noncrystalline material, preferably a chalcogenide glass, which is capable of wetting the adjoining layers and bonding them together and which is, in effect, transparent in the desired spectral range. A composite window is thus provided which has the desired optical properties and which is highly resistant to erosion or other damage but which avoids the difficulties and problems encountered in attempting to use vacuum deposited protective coatings.

BRIEF DESCRIPTION OF THE DRAWING

The invention will be more fully understood from the following detailed description, taken in connection with the accompanying drawing, in which.

DESCRIPTION OF THE PREFERRED EMBODIMENT

Figure 1:
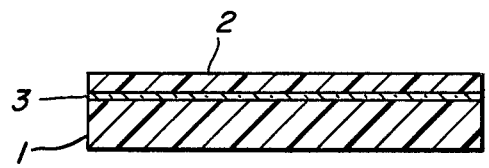
FIG. 1 is a sectional view of a typical optical window embodying the invention.

As previously indicated, the present invention provides an erosion-resistant, composite optical window consisting essentially of a substrate of good optical transparency with a protective cladding or protective layer bonded to it by a bonding material of suitable characteristics. The structure of such a window is indicated in FIG. 1 which shows a substrate 1 of a material selected for its optical properties so as to have good transparency in the desired spectral range, such as the visible and infrared region of the spectrum, and which is made thick enough to have sufficient mechanical strength for utilization as an airborne window. Since the most desirable materials for this purpose have poor resistance to erosion by high velocity raindrops, or have low moisture resistance, the substrate 1 is protected by a cladding layer 2 placed over the substrate 1 and bonded to the substrate by a layer of bonding material 3. The protective layer 2 is made of a material selected primarily for its moisture and erosion resistance, although it must have sufficient transparency to be usable. As previously mentioned, there are a number of available materials which have sufficient transparency in thin sections to not materially affect the optical properties of a composite structure such as shown in FIG. 1, and which have sufficient moisture resistance and erosion resistance to effectively protect the substrate.

While any suitable materials may be utilized which have the desired characteristics, the substrate 1 is preferably made of a material such as zinc selenide which has excellent transparency in the infrared although it has little resistance to rain erosion. Other materials having similar characteristics such as barium fluoride, sodium chloride, potassium chloride and gallium arsenide might also be utilized, depending on the spectral region of interest. The protective layer 2 may similarly be made of any suitable material having the desired characteristics. Zinc sulfide is a particularly suitable material which has acceptable optical transmission in very thin sections and which has good resistance to rain erosion. Other suitable materials such as calcium fluoride or magnesium fluoride could, of course, be used.

The bonding material is important since it must form a good joint which is solid, free of pores, durable and strong. To satisfy these requirements, a noncrystalline material or glass should be utilized for the bonding layer 3 which is capable of wetting both components 1 and 2 of the window. A preferred material, which has been found to give highly satisfactory results, comprises the chalcogenide glasses of the arsenic-sulfur-selenium system. While other suitable materials might be used, such as certain epoxies, these glasses have the necessary characteristics mentioned above and suitable compositions can be chosen to meet the following essential criteria. The bonding material must have a refractive index close to the refractive indices of either the protective layer or the substrate so as to limit reflection losses at the joint. It must have good transparency over the desired spectral range, in this case 0.5 to 12 micrometers, it must have a softening temperature well below the melting points of the materials of the protective layer and the substrate, and it must have minimal chemical reactions with both materials. Glass compositions of the arsenic-sulfur-selenium system exist for which a variety of refractive indices and softening temperatures are possible, so that the bonding materials can be tailored to fit the properties of the particular materials to be joined. For example, two representative glass compositions of this system having different flow properties are the following:

|  | Glass #1 | Glass #2 |
|---|---|---|
| Composition (by weight) | 40% As, 40% S, 20% Se | 20% As, 60% S, 20% Se |
| Softening Temperature | 250° C | 150° C |
| Flow Temperature | 350° C | 225° C |

These two glasses have been tested in actual embodiments of the invention in the following manner. The glasses themselves were prepared by reaction of the elements at 800° C followed by slow cooling of the ingots to room temperature. The resulting ingots were sliced into 20 mil thick wafers for use in bonding the composite windows. The windows were each made from a piece of zinc sulfide 40 × 12 × 1 millimeter to serve as the protective layer with a substrate consisting of a piece of zinc selenide 40 × 12 × 6 millimeters. One surface of each of these members was lapped flat and coated with a 10 micrometer layer of the glass by vacuum evaporation to assure complete coating of each surface. One of the 20-mil glass wafers was then inserted between the coated surfaces of the zinc sulfide and zinc selenide, a weight was applied to the resulting sandwich, and it was then heated in vacuum to the flow temperature of the particular glass used. The temperature was held constant for approximately 2 hours, during which time excess glass was squeezed from the joint and the composite was then slowly cooled to room temperature.

Figure 2:
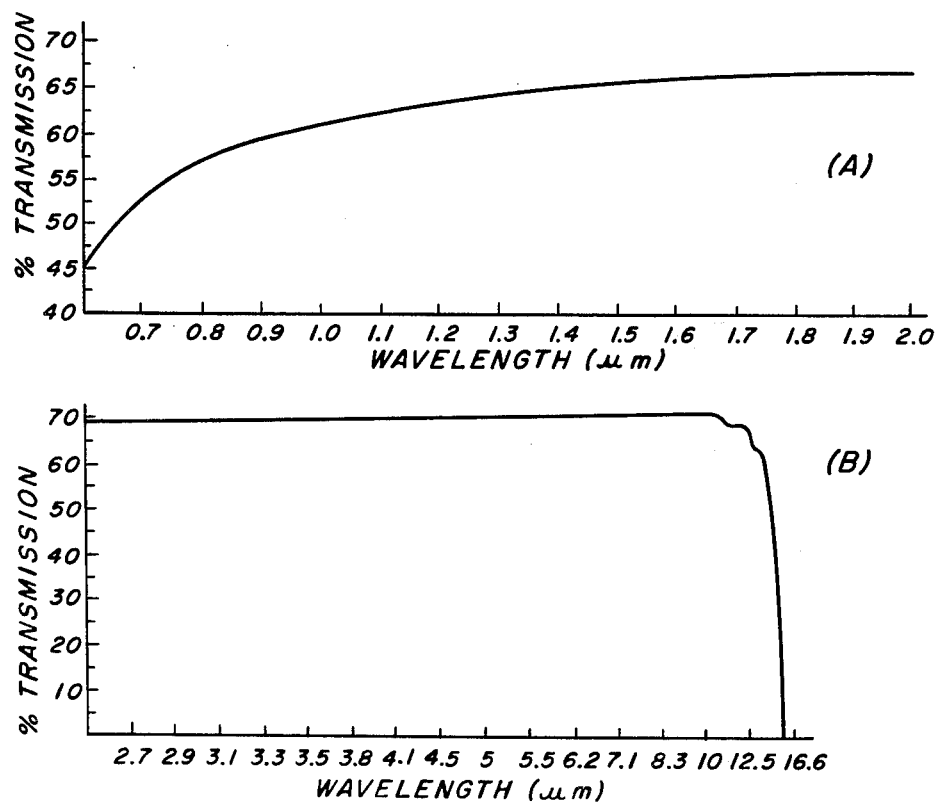
FIG. 2 is a set of curves showing typical infrared transmission of such a window.

This procedure resulted in a strong, solid, nonporous joint between the protective layer and the substrate, and microscopic examination showed that the glass had wetted both the zinc sulfide and the zinc selenide and formed a relatively uniform layer from 2 to 5 micrometers thick. The thickness of the glass bond can, of course, be controlled by the manner in which the weight is applied to give the desired joint characteristics, and glass compositions intermediate between those given above could be used to obtain the desired properties. The optical transmission of a composite window made in this manner and bonded with glass #1 described above is shown in FIG. 2. Similar windows made with glass #2 showed essentially the same transmission. As shown by the curves A and B of FIG. 2, the transmission was approximately 70% over the spectral range from 2.5 to 13 micrometers and decreased to about 65% at 1.06 μm and 50% at 0.65 μm. This decrease in transmission at the lower infrared wavelengths was due entirely to scattering and absorption in the zinc sulfide cladding. This illustrates why zinc sulfide by itself is unsuitable for use in thick window sections, although in the very thin sections needed for a protective layer, the composite can be made to exhibit acceptable properties.

It will now be apparent that a composite optical window structure has been provided which has excellent optical properties in the desired spectral range and which has excellent rain erosion resistance so that it is capable of meeting the requirements for the severe conditions of airborne service. The zinc sulfide-chalcogenide glass-zinc selenide composite structure has shown highly satisfactory characteristics as discussed above, but it will be apparent that other suitable materials might be utilized and can be selected to provide the required optical properties for the particular spectral range of interest.

What is claimed is:

1. An optical window comprising a substrate of material having high transparency over a desired spectral range of infrared radiation, a protective layer of a material of high resistance to rain erosion, said protective layer being thin as compared to the substrate and of such thickness that it does not materially affect the optical properties of the window, and a layer of noncrystalline bonding material joining said protective layer to said substrate, said bonding material being a glass which is transparent in said spectral range, and which has a refractive index close to the refractive index of at least one of the protective layer and the substrate, and a softening temperature below the melting points of the protective layer and the substrate.

2. An optical window as defined in claim 1 in which said substrate is zinc selenide.

3. An optical window as defined in claim 1 in which said bonding material is a chalcogenide glass.

4. An optical window as defined in claim 3 in which said glass has a composition by weight of about 40% to 20% arsenic, about 40% to 60% sulfur, and about 20% selenium.

5. An optical window as defined in claim 1 in which the substrate is zinc selenide and the protective layer is zinc sulfide.

6. An optical window as defined in claim 5 in which the bonding material is a chalcogenide glass.

7. An optical window as defined in claim 1 in which said substrate is a material selected from the group consisting of zinc selenide, barium fluoride, sodium chloride, potassium chloride and gallium arsenide, said protective layer is a material selected from the group consisting of zinc sulfide, calcium fluoride and magnesium fluoride, and said bonding material is a chalcogenide glass.

8. An optical window as defined in claim 7 in which said glass has a composition by weight of about 40% to 20% arsenic, about 40% to 60% sulfur, and about 20% selenium.

* * * * *